United States Patent [19]

Kramer et al.

[11] 3,918,547

[45] Nov. 11, 1975

[54] BUS WITH WATER-COOLED REAR ENGINE

[75] Inventors: Willi Krämer, Waiblingen; Peter Fietz, Stuttgart, both of Germany

[73] Assignee: Daimler-Benz Aktiengesellschaft, Germany

[22] Filed: July 25, 1973

[21] Appl. No.: 382,335

[30] Foreign Application Priority Data

May 2, 1973  Germany............................ 2322024

[52] U.S. Cl. ............................. 180/54 A; 180/68 R
[51] Int. Cl.² ......................................... B60K 11/04
[58] Field of Search ............... 180/68 R, 68 P, 54 A

[56] References Cited
UNITED STATES PATENTS

| | | | |
|---|---|---|---|
| 1,820,035 | 8/1931 | Stokes........................... | 180/54 A X |
| 3,147,814 | 9/1964 | Suhre............................. | 180/54 A |

FOREIGN PATENTS OR APPLICATIONS

| | | | |
|---|---|---|---|
| 777,559 | 6/1957 | United Kingdom............... | 180/54 A |

*Primary Examiner*—Stanley H. Tollberg
*Assistant Examiner*—Hadd Lane
*Attorney, Agent, or Firm*—Craig & Antonelli

[57] ABSTRACT

A bus with a water-cooled rear engine in which the engine and radiator are laterally offset with respect to each other, in which an air suction aperture is coordinated to the radiator in a longitudinal side wall of the bus forming also a side wall of a chamber which is closed off with respect to the engine space and accommodates the radiator, and in which a regulated fan supplying air into the engine space and operating as suction fan is arranged to the rear of the radiator, in relation to the longitudinal direction of the bus; the engine space is thereby lined with a noise-absorbing material and includes a cover panel which closes off the engine space in the downward direction while an air discharge aperture is provided in the engine space enclosure which, in relation to the vehicle longitudinal direction, is disposed in front of the engine approximately at the height of the cover panel.

5 Claims, 1 Drawing Figure

U.S. Patent Nov. 11, 1975 3,918,547
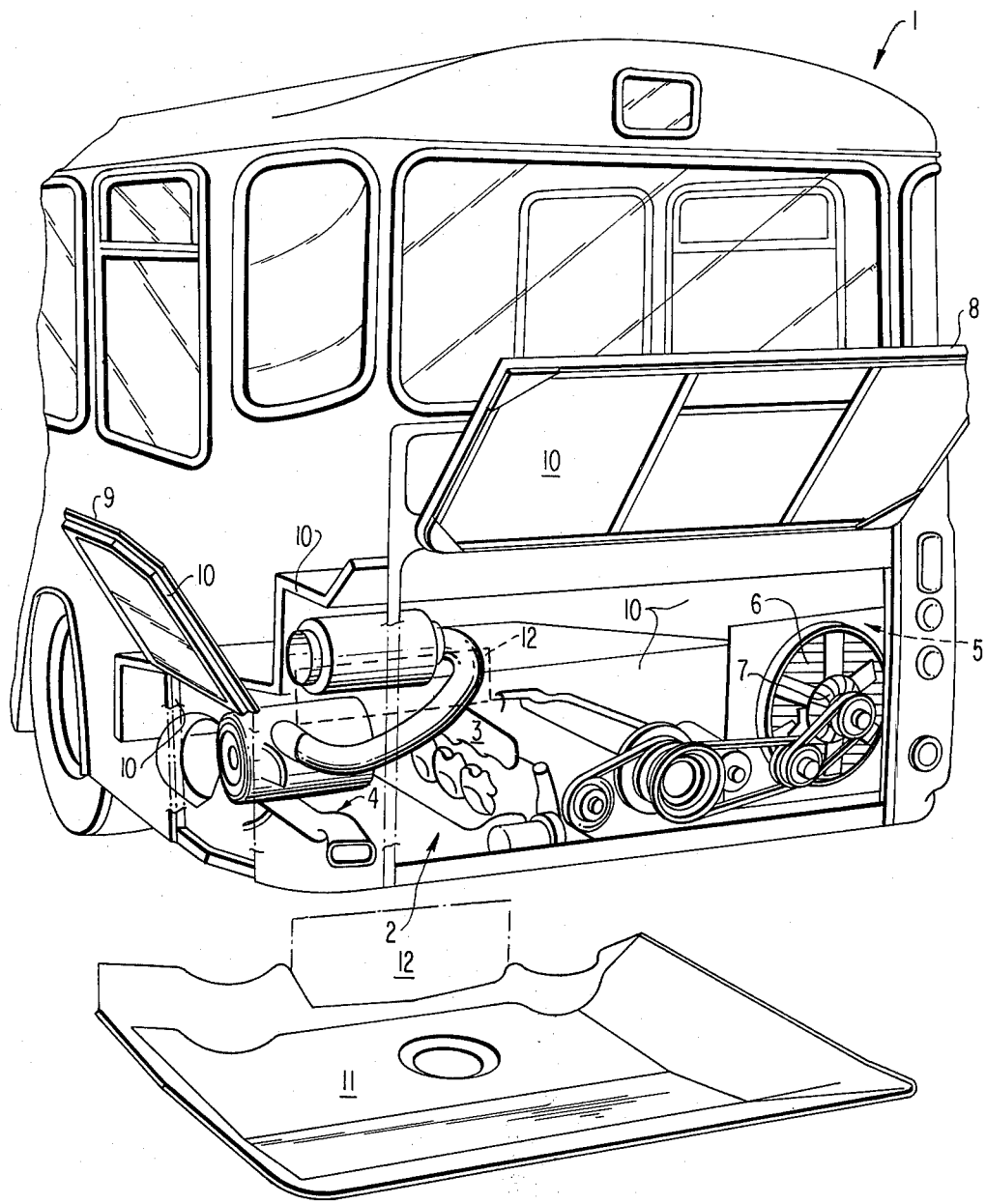

BUS WITH WATER-COOLED REAR ENGINE

The present invention relates to a bus with a water-cooled rear engine, in which the engine and radiator are arranged laterally offset with respect to each other, in which an air suction opening which is coordinated to the radiator arranged upright transversely to the driving direction and adjacent a longitudinal side wall of the bus within a chamber separated off with respect to the engine space is provided in the longitudinal side wall of the bus forming one side of the chamber, and in which a viscosity fan acting as suction fan and supplying air into the engine space is provided to the rear of the radiator, in relation to the longitudinal direction of the bus.

The present invention is concerned with the task to so further develop such a bus that a reduction of the external noises is achieved.

According to the present invention, this is attained by features which, as such, may be known in part, that the engine space is provided with an encapsulating enclosure made of noise-absorbing material which includes a lower cover closing off the engine space in the downward direction and in that the encapsulating enclosure is provided in its area in front of the engine, in relation to the vehicle longitudinal direction, with an air discharge aperture approximately at the height of the cover shell. In the construction according to the present invention, the air drawn-in through the radiator is further used for cooling the engine space. The air stream necessary for the through-flow through the engine space is therefore produced in the solution according to the present invention by the controlled fan which is present already for sucking in air through the radiator. It is thereby assured by a corresponding design and dimension of the controlled fan that the supplied air quantity is adequate for both purposes, namely, for a sufficient cooling off of the cooling water in the radiator as also the necessary removal of the heat out of the engine space.

Accordingly, it is an object of the present invention to provide a bus with a water-cooled rear engine which avoids by simple means the aforementioned shortcomings and drawbacks encountered in the prior art.

Another object of the present invention resides in a bus with a water-cooled rear engine which results in a significant reduction of the noises which can be noticed on the outside of the bus.

A further object of the present invention resides in a bus with a water-cooled rear engine in which an excessive heat in the engine space is effectively avoided by the air stream used also for cooling the radiator connected in the cooling water circulatory system.

Still a further object of the present invention resides in a bus with a water-cooled rear engine in which adequate cooling of the cooling water as well as of the engine space is realized by extremely simple and operationally reliable means.

These and further objects, features and advantages of the present invention will become more apparent from the following description when taken in connection with the accompanying drawing which shows, for purposes of illustration only, one embodiment in accordance with the present invention, and wherein:

The single FIGURE is a partial perspective, somewhat schematic view of a bus with a water-cooled rear engine and with an engine enclosure equipped according to the present invention.

Referring now to the single FIGURE of the drawing, the rear end of a bus generally designated by reference numeral 1 is illustrated in this FIGURE, as viewed from the rear and left of the bus. The rear end of the bus 1 includes an engine space generally designated by reference numeral 2 with an engine 3 of conventional construction arranged therein. In addition to the engine 3 a number of auxiliary aggregates as well as an exhaust system 4 are arranged in the engine space 2. A chamber generally designated by reference numeral 5 is provided adjacent the engine space 2 and adjoining a longitudinal side wall of the bus 1, in the given embodiment adjoining the right longitudinal side wall of the bus which cannot be seen in the single FIGURE of the drawing. The radiator 6 which is arranged in this chamber 5 is thus shielded with respect to the engine space 2 and is disposed therein in an upright position transverse to the driving or longitudinal direction of the bus 1. An opening (not shown) in the right side wall (not shown) of the bus 1 is coordinated to the chamber 5; a fan 7, in the illustrated embodiment a viscosity fan which is disposed to the rear of the radiator 6 in relation to the longitudinal direction, thereby sucks fresh air through this inlet opening (not shown) in the side of the bus and through the radiator 6 arranged downstream thereof, and forces the thus sucked-in air into the engine space 2. As can be seen from the single FIGURE of the drawing, the engine space 2 is accessible from the rear and from the side by a respective flap 8 and 9 adapted to be opened by upward pivoting. The flaps 8 and 9 as well as also the remaining boundary walls of the engine space 2 are provided with a liner 10 of noise-absorbing material so that with closed flaps 8 and 9 an encapsulation of noise-absorbing material exists for the engine space which is completed in the downward direction by a cover 11 closing off the engine space 2 in the downward direction. The cover 11 is illustrated in the drawing displaced downwardly in order not to impair the visibility of the illustrated embodiment. An essentially closed encapsulation is created by the cover 11 closing off the engine space 2 in the downward direction in conjunction with the lining of the engine space, into which air is sucked in by the fan 7 by way of the inlet opening and the radiator 6. The fan 7 and the radiator 6 arranged adjacent thereto are thereby located near the rear boundary of the bus 1 so that the air forced by the fan 7 into the engine space 2 has to flow through a large portion of the engine space 2 before it is able to escape into the atmosphere through the air discharge aperture 12 provided within the area disposed in front of the engine 3 approximately at the height of the covering shell—in relation to the installed position. As a result thereof, the air forced into the engine space 2 by the fan 7 and already warmed up in the radiator 6 is used further for the decrease of the heat in the engine space 2 and thus is used in particular for avoiding accumulations of heat in the engine space 2. By an appropriate matching of the regulating characteristics of the fan 7 which is constructed in the given embodiment as viscosity fan, it is assured that under all possible load conditions the radiator 6 is acted upon to a sufficient degree with fresh air and a flow of air is assured through the engine space 2 to the extent necessary for the decrease of the heat.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What we claim is:

1. In a bus of the type having a water-cooled rear engine and including a radiator means and fan means cooperating with said radiator means, said engine and radiator means being laterally offset with respect to each other in separate first and second chambers, respectively, said respective chambers being encapsulated with a noiseabsorbing material, the improvement comprising said fan means being mounted between said respective chambers substantially at one end of said engine near the rear wall of the engine chamber for drawing air through said radiator means, a single air discharge aperture arranged near the front end of said engine at a front wall of the engine chamber for receiving the air from said fan flowing through the longitudinal extent of the engine chamber and out said air discharge aperture, and a lower cover means for removably enclosing said respective chambers, said lower cover means being removable for servicing said engine and radiator means, and said air discharge aperture being disposed near said front end of said engine above said lower cover means.

2. A bus according to claim 1, wherein said second chamber of said radiator means is arranged adjacent to a longitudinal sidewall of the bus.

3. A bus according to claim 2, wherein said radiator means is arranged in said second chamber substantially upright and transversely to the driving direction.

4. A bus according to claim 3, wherein an air intake means for introducing air into said second chamber is arranged in said longitudinal sidewall.

5. A bus according to claim 1, wherein said fan means is a controlled viscosity fan.

* * * * *